T. A. REYNOLDS.
INDEX FOR BAROMETERS AND OTHER INDICATING INSTRUMENTS.
APPLICATION FILED MAY 5, 1909.

987,746.

Patented Mar. 28, 1911.

UNITED STATES PATENT OFFICE.

THOMAS ADOLPHUS REYNOLDS, OF LONDON, ENGLAND.

INDEX FOR BAROMETERS AND OTHER INDICATING INSTRUMENTS.

987,746.      Specification of Letters Patent.      Patented Mar. 28, 1911.

Application filed May 5, 1909. Serial No. 494,155.

*To all whom it may concern:*

Be it known that I, THOMAS ADOLPHUS REYNOLDS, a subject of the King of Great Britain and Ireland, and residing at 130 and 132 Clerkenwell road, London, E. C., England, have invented certain new and useful Improvements in and Connected with Indexes for Barometers and other Indicating Instruments, of which the following is a specification.

This invention relates to barometers, windgages, thermometers, electric meters and other scientific indicating instruments wherein a pointer is adapted to travel over a dial or scale and also wherein an auxiliary pointer or index is adapted to be set by hand to coincide with the main pointer at any time and then to remain stationary where set so that when the main pointer moves from its initial position the stationary pointer or index indicates the original position. In barometers this index is usually mounted on a central pin riveted or otherwise pivotally mounted in the glass protecting the dial, the pin being provided with a milled head or the like to facilitate setting of the index. This arrangement necessitates drilling a hole in the center of the glass which not only renders the glass liable to fracture during drilling and broaching, but also weakens the glass and renders it more liable to be broken when in use upon the instrument than a solid or imperforated glass would be.

The object of the present invention is to enable one or more indexes to be used without necessitating drilling of the glass so that a solid or imperforated glass may be used and the above objections avoided, and further so that a clearer or unobstructed view of the dial is obtained and manipulation of the index or indexes is facilitated.

The invention consists broadly in mounting a non-pivoted index in such a way that it can be moved relatively to the scale on the dial.

The invention also consists in mounting an index upon a bezel or ring which is adapted to be revolved, or in mounting or providing the index upon a glass adapted to be revolved in or with its bezel or ring, or further in mounting one index upon a revoluble bezel or ring and providing another for the same instrument on a glass revolubly mounted in said revoluble bezel or ring.

Figure 1:
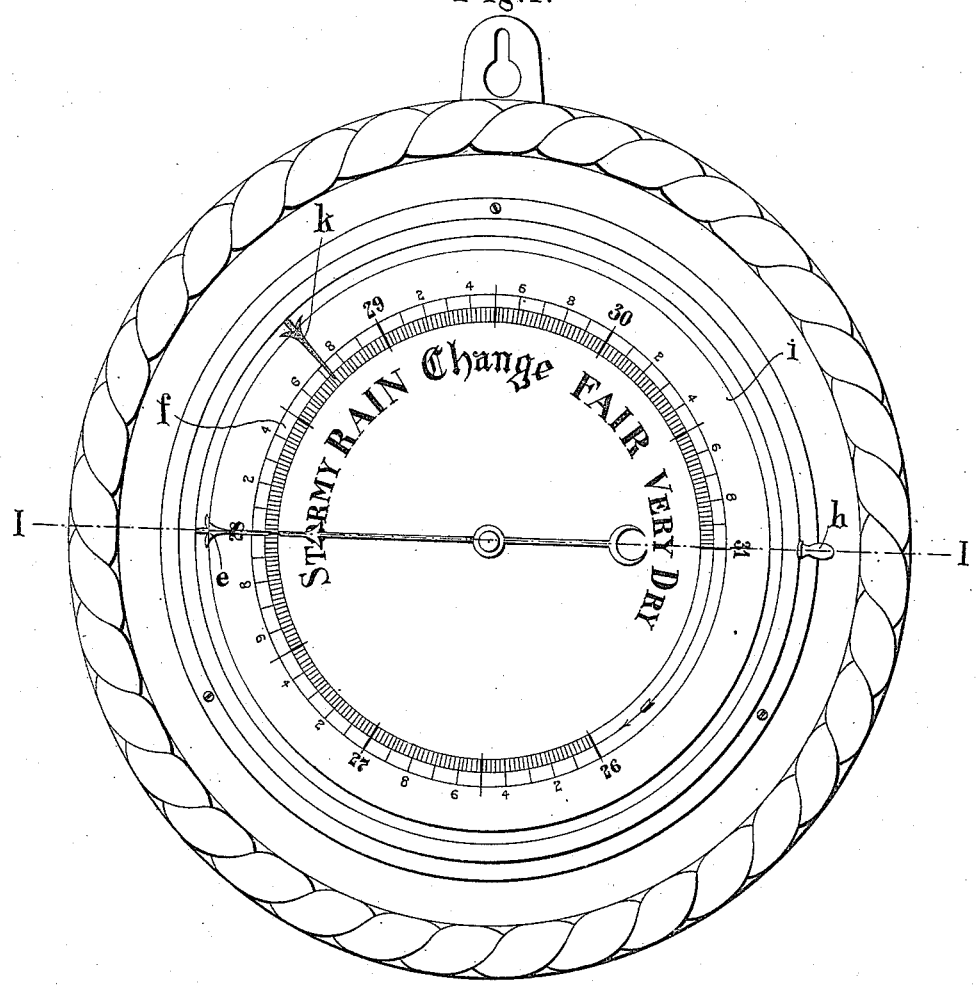
Figure 2:
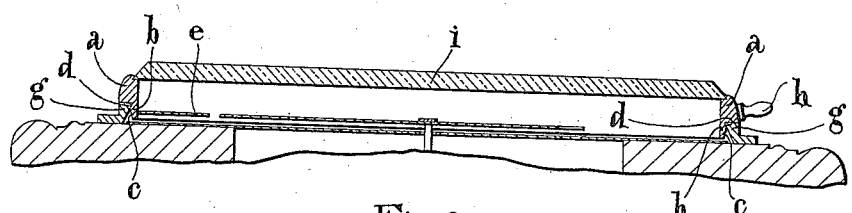

The accompanying drawings illustrate the application of the invention to a barometer, Figure 1 being a front view and Fig. 2 a cross section of the dial and fittings thereon the section being taken on I—I Fig. 1.

In carrying out the invention according to one mode as in the application to a barometer, the bezel or ring, $a$, is provided with a depending ridge or flange, $b$, which is somewhat beveled or coned inwardly for a part, $c$, of its depth and is slightly undercut or turned out for the remainder, $d$, of its depth nearer the ring or bezel, $a$. The bezel, $a$, is provided with a metal or other index, $e$, projecting radially inward, the index, $e$, being only of sufficient length to pass over the scale, $f$, on the dial, and may therefore be much shorter than the usual index. The flange, $b$, on the bezel is adapted to be thrust into a sharply beveled ring, $g$, formed integrally with or screwed or otherwise secured to the instrument. This ring, $g$, springs somewhat over the flange, $b$, of the bezel, $a$, until its sharp edge is in the undercut or turned out part, $d$, of the flange, $b$. By this arrangement the bezel, $a$, is held with sufficient firmness but can be easily revolved in its ring, $g$, by means of a small handle or knob, $h$.

Instead of mounting the index upon a revoluble bezel it may be mounted or marked as at $k$, on a glass, $i$, which can be revolved either with or in its bezel, $a$, which is accordingly revolubly mounted or fixed as usual, or if desired one index, $e$, may be mounted on a revoluble bezel, $a$, and another, $k$, may be marked on a glass, $i$, revoluble in said bezel so that two indexes, $e$ $k$, are provided either or both of which are available for use.

It is to be understood that the invention is not confined to any special mode of mounting the revoluble bezel or revoluble glass or the index on either of them as these details will be varied to suit the type of barometer, thermometer, windgage, electric meter or other instrument to which the invention is to be applied.

The instrument may be used with either one or two of the said indexes.

Having now described my invention what I claim as new and desire to secure by Letters Patent is:—

1. In an instrument of the class referred to and having a dial, and a bezel surrounding said dial, a glass disk revolubly mounted in said bezel and an index carried by said disk, substantially as and for the purpose hereinbefore set forth.

2. In an instrument of the class referred to and having a dial, a revoluble bezel an index carried by said bezel, a glass disk revolubly mounted in said bezel, and a second index carried by said disk, substantially as and for the purpose hereinbefore set forth.

3. In an instrument of the class referred to and having a dial, a revoluble bezel, a glass disk mounted in said bezel and an index, adapted to be moved with said bezel and glass relatively to said dial substantially as and for the purpose hereinbefore set forth.

In testimony whereof I have signed my name to this specification in the presence of two subscribing witnesses.

THOMAS ADOLPHUS REYNOLDS.

Witnesses:
BERTRAM H. MATTHEWS,
ALBERT E. PARKER.

Copies of this patent may be obtained for five cents each, by addressing the "Commissioner of Patents, Washington, D. C."